No. 734,692. PATENTED JULY 28, 1903.
G. F. FRALEY.
PHOTOGRAPHIC CURTAIN SHUTTER.
APPLICATION FILED FEB. 26, 1903.
NO MODEL. 2 SHEETS—SHEET 1.
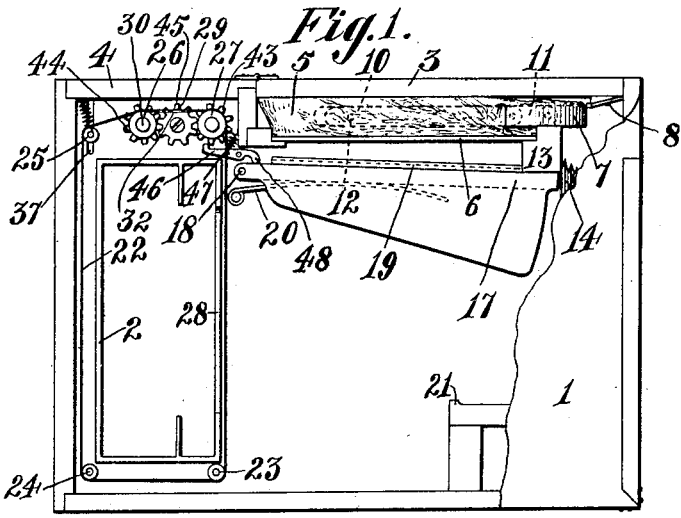
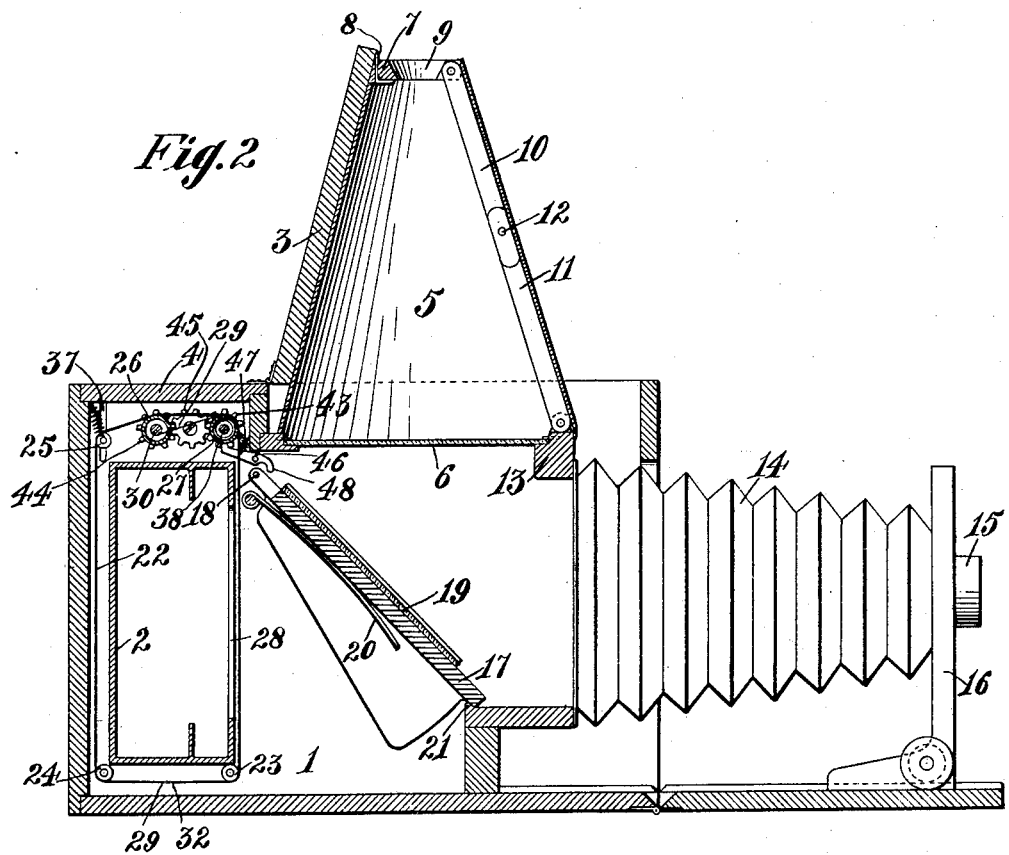
Witnesses:
F. G. Hachenberg.
Henry Thieme
Inventor:
Gaumer F. Fraley
by attorneys
Brown & Seward No. 734,692. PATENTED JULY 28, 1903.
G. F. FRALEY.
PHOTOGRAPHIC CURTAIN SHUTTER.
APPLICATION FILED FEB. 26, 1903.
NO MODEL. 2 SHEETS—SHEET 2.

Witnesses:
F. G. Hackenberg.
Henry Thieme

Inventor:
Gasner F. Fraley
by attorneys

No. 734,692. Patented July 28, 1903.

UNITED STATES PATENT OFFICE.

GASSNER F. FRALEY, OF NEW YORK, N. Y., ASSIGNOR TO PATRICK H. BETTMAN, OF CHICAGO, ILLINOIS.

PHOTOGRAPHIC CURTAIN-SHUTTER.

SPECIFICATION forming part of Letters Patent No. 734,692, dated July 28, 1903.

Application filed February 26, 1903. Serial No. 145,167. (No model.)

*To all whom it may concern:*

Be it known that I, GASSNER F. FRALEY, a citizen of the United States, and a resident of the borough of Manhattan, in the city and State of New York, have invented a new and useful Photographic Curtain-Shutter, of which the following is a specification.

This invention relates to photographic cameras which are provided with shutters of the roller-blind type, which shutters are well known as "focal-plane" shutters.

One object of this invention is to provide certain improvements in the construction, form, and arrangement of the several parts whereby a very simple and complete mechanism is provided for operating the shutter.

A still further object is to provide an improvement in the focusing-hood of the camera whereby it may be readily folded out of the way within the camera-box when not in use.

A practical embodiment of my invention is represented in the accompanying drawings, in which—

Figure 3:
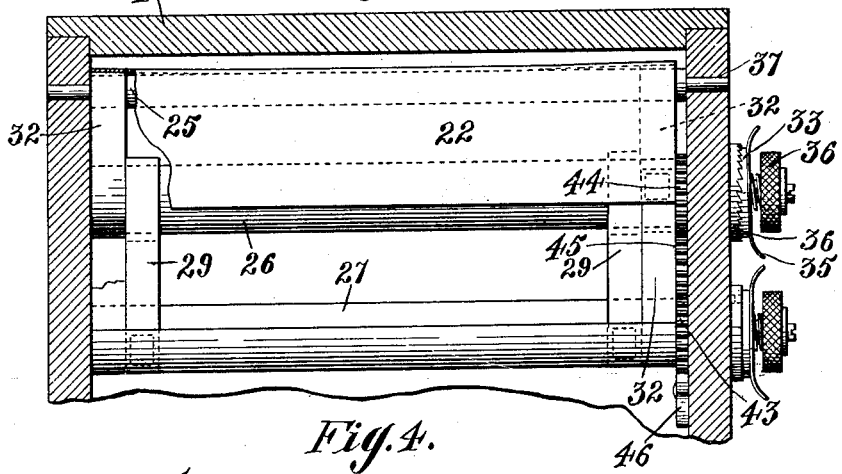
Figure 4:
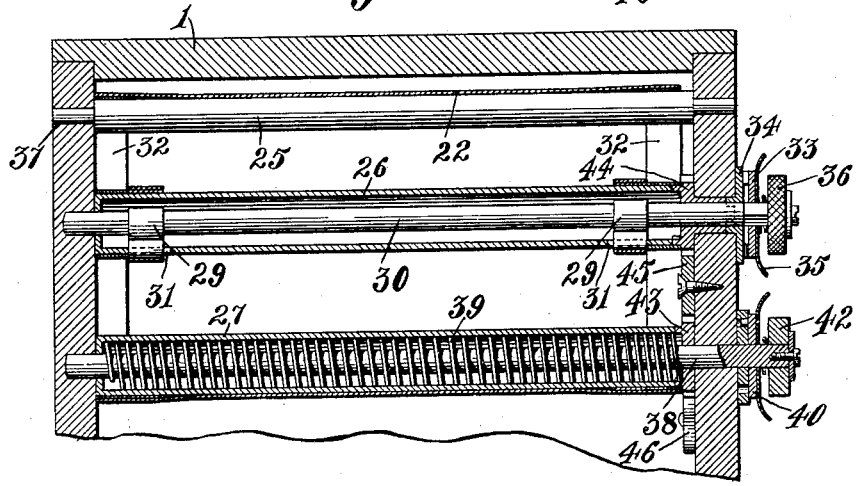
Figures 5, 6:
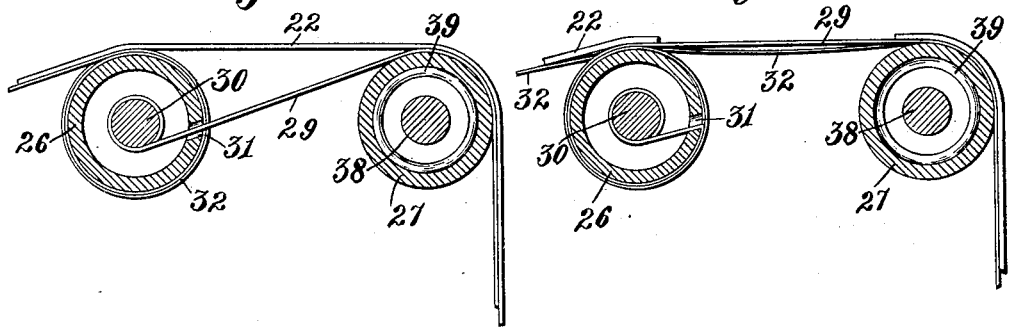

Figure 1 represents the camera in side elevation, partially in section, with the focusing-hood folded within the camera-box, the swinging mirror-plate being shown at the limit of its upward movement with the motor-gear-controlling pawl released and the shutter at the limit of its upward movement. Fig. 2 is a longitudinal section through the camera, showing the focusing-hood extended and the swinging mirror-plate swung to the limit of its downward movement in position to reflect the object from the lens onto the ground glass of the focusing-hood, the shutter being shown at the limit of its downward movement and the motor-gear-controlling pawl in position to lock the motor in its wound-up position ready to operate the shutter when the pawl is released. Fig. 3 is an enlarged horizontal section through a portion of the camera-box, showing the motor-roller and the means for adjusting the ends of the shutter with respect to each other. Fig. 4 is a transverse horizontal section taken through the adjusting-roller and the motor-roller. Fig. 5 is a detail vertical section through the motor-roller and the adjusting-roller, the parts being in the position which they assume when the motor is wound up ready to operate the shutter; and Fig. 6 is a detail vertical section through the motor-roller, the adjusting-roller, and the adjacent ends of the shutter with their attached adjusting tapes or bands.

The camera-box is denoted as a whole by 1, and it is provided in its rear portion with a suitable plate-holder 2, around which the shutter passes, as will be hereinafter explained.

In the top of the camera-box I provide a swinging door or cover 3, hinged transversely of the camera-box to a stationary portion 4 of the top of the said box.

A hood 5, of flexible material, is secured at its bottom around the edges of a horizontally-disposed ground-glass plate 6 within the camera-box. The top of the hood is secured to an eyepiece 7, hinged at 8 to the outer end of the swinging cover 3, which eyepiece is provided with a suitable peep-hole 9 therethrough. The hood 5 is held distended by a folding brace 10 11, the adjacent ends of the two members being hinged together at 12, and their opposite ends being hinged, respectively, to the eyepiece 7 and to a cross-bar 13, upon which one edge of the ground-glass plate 6 rests. The parts are so arranged that when the members 10 11 of the brace are folded together and the cover 3 swung down into its closed position the hood will be collapsed within the camera-box. A bellows 14 is secured at its inner end to the camera-box and at its outer end is provided with a lens-holder 15 and a sliding support 16 therefor of any suitable construction.

The means which I employ for reflecting the image disclosed through the lens onto the ground-glass plate 6 comprises a swinging mirror-plate 17, hinged at 18 within the box adjacent to the inner end of the ground-glass plate 6. This plate is provided on its front face with a mirror 19, and the plate 17 is normally held at the limit of its upward movement adjacent to the ground-glass plate 6 by a spring 20.

A stop 21 is provided for limiting the downward swinging movement of the plate 17, which stop is so arranged that when the plate is at the limit of its downward movement it will occupy a diagonal position with respect to the ground-glass plate 6 and lens, so as to reflect the image disclosed through the lens onto the said ground-glass plate, where it may be observed by the operator through the peep-hole 9 at the upper end of the focusing-hood 5.

I have not shown herein the means for locking and releasing the swinging plate 17, as it forms no part of my present invention.

The shutter comprises an opaque curtain 22, which passes around the plate-holder 2 and is engaged with idler-rollers 23 24 adjacent to the front and rear lower edges of the plate-holder and a spring-actuated idler-roller 25 adjacent to the rear upper edge of the plate-holder. This curtain also passes over the top of an adjusting-roller 26, located between the top of the plate-holder 2 and the stationary portion 4 of the top of the camera-box. The curtain also passes part way around the periphery of the motor-roller 27, from which roller the curtain extends in front of the opening 28 in the front of the plate-holder 2.

Flexible connections 29—such, for instance, as tapes—located near the opposite sides of the camera-box, are attached to one end of the curtain and at the other end are wound upon the shaft 30 of the adjusting-roller 26, the said tapes passing through slots 31 in the said rollers. Flexible connections 32—such, for instance, as tapes—located adjacent to the opposite sides of the camera-box, are connected at one end to the other end of the curtain 22 from that to which the bands 29 are attached, which tapes 32 are wound upon the periphery of the adjusting-roller 26.

The means which I employ for adjusting the distance between the adjacent ends of the curtain is constructed, arranged, and operated as follows: The adjusting-roller 26 is hollow and is loosely mounted at its opposite ends upon its shaft 30. The roller may be connected to or released from the shaft by any suitable means—for instance, such as that shown herein—in which a spring-actuated clutch 33 is carried by the shaft, which clutch is fitted to be engaged with a disk 34, carried by the roller. The clutch 33 may be provided with suitable handles 35 for the purpose of withdrawing the clutch from its engagement with the plate 34 when it is desired to turn the shaft 30 without turning the roller 26. The shaft 30 is provided with a suitable operating-handle 36. When the shaft 30 is disconnected from the roller 26, the shaft may be turned in a direction to wind up the tapes 29, thus drawing the end of the curtain to which the tapes are attached toward the adjacent end of the curtain. This contraction of the slot formed between the ends of the curtain is permitted because of the engagement of the bands and curtain with the spring-actuated idler-roller 25, which idler-roller has a sliding engagement in slots 37 at its opposite ends in the sides of the camera-box. If the shaft 30 should be turned in the opposite direction, the flexible connections or tapes 29 will be let off from the shaft and the spring-actuated roller 25 will draw the end of the curtain to which the tapes 29 are attached away from the other end of the curtain.

The means which I have shown for operating the curtain is constructed, arranged, and operated as follows: The hollow roller 27 is mounted at its opposite ends in its shaft 38. A motor-spring 39 is located within the roller 27 and has one end attached to the roller. The shaft 38 is normally held against rotation by means of a yielding pin-plate 40, carried by the shaft, and a stationary socket-plate 41 on the side of the camera-box. The shaft 38 is provided with a suitable handle 42, by means of which the shaft may be turned in one or the other direction to adjust the tension of the spring 39, irrespective of the means for winding the spring to set it ready to operate the shutter. The rollers 26 and 27 are geared to rotate simultaneously in the same direction by providing the roller 27 with a spur-gear 43, the roller 26 with a spur-gear 44 and an intermediate spur-gear 45, which intermeshes with the gears 43 and 44. A spring-actuated locking and releasing pawl 46 is hinged to the side of the camera-box in position to engage the teeth of the spur-gear 43 on the motor-roller 27. A spring 47 tends to hold the pawl 46 in engagement with the said spur-gear 43. The pawl 46 is provided with a tailpiece 48, which is so located that when the swinging mirror-plate 17 approaches the limit of its upward movement it will engage the tailpiece 48 of the pawl and swing it upwardly, thus releasing the pawl from the spur-gear 43. Supposing the parts to be in the position shown in Fig. 1, with the ends of the curtain or shutter adjacent to the adjusting and motor rollers, the operation of the device is as follows: The shaft 30 and adjusting-roller 26 are turned together in a direction to draw the slot downwardly until it reaches the point shown in Fig. 2. The width of the slot may then be accurately adjusted by turning the shaft 30 of the adjusting-roller in one direction or the other. The turning of the adjusting-roller and its shaft for drawing the slot in the shutter to the limit of its downward movement will, because of the geared connection between the adjusting-roller and the motor-roller, also rotate the motor-roller, thus winding up the spring 39 therein. The mirror-plate 17 is swung down into the position shown in Fig. 2 by any suitable means, (not shown herein,) thus causing the pawl 46 to engage the spur-gear 43 of the motor-roller for locking the roller against movement. After the camera has been accurately focused the swinging mirror-plate 17 is released, and as it approaches the limit of its upward movement it will engage the pawl 46 and cause it to swing out of engagement with the motor-roller gear 43. This will release the motor-spring 39 and permit it to rotate the roller 27, and thereby the roller 26, thus causing the shutter to be wound in a direction to cause its slot to pass across the front of the opening 28 in the plate-holder 2.

What I claim is—

1. A continuous shutter-curtain, rollers therefor, and an adjusting-roller for positively moving one end of the curtain toward and away from the other end of the curtain to decrease and increase the width of the slot between the ends of the curtain.

2. A continuous shutter-curtain, rollers therefor, an adjusting-roller for positively moving one end of the curtain toward and away from the other end of the curtain to decrease and increase the width of the slot between the ends of the curtain and a separate motor-roller for operating the curtain.

3. A continuous shutter-curtain, rollers therefor, and means for adjusting one end of the curtain toward and away from the other end of the curtain comprising an adjusting-roller and its shaft and flexible connections between the roller and one end of the curtain and between the shaft and the other end of the curtain.

4. A continuous shutter-curtain, rollers therefor, an adjusting-roller for determining the width of the slot between the ends of the curtain and a motor-roller for operating the curtain, geared to the adjusting-roller.

5. A continuous shutter-curtain, rollers therefor and means for determining the width of the slot between the ends of the curtain comprising a hollow roller, a flexible connection between the roller and one end of the curtain, a shaft within the roller and a flexible connection between the shaft and the other end of the curtain and means for connecting and disconnecting the shaft and roller.

6. A continuous shutter-curtain, rollers therefor, an adjusting-roller and its shaft, flexible connections between the adjacent ends of the curtain and the roller and shaft, a motor-roller engaging the curtain and geared to the adjusting-roller whereby the motor is wound up when the adjusting-roller is rotated to bring the slot between the ends of the curtain to the limit of its movement in one direction.

7. A continuous shutter-curtain, rollers therefor and means for operating the curtain comprising a motor-roller, its shaft and a spring connecting the roller and shaft and means for holding the shaft against movement when the roller is rotated in one direction for winding the motor-spring and means for locking and releasing the roller.

8. In a camera, a swinging mirror-plate, a continuous shutter-curtain, rollers therefor, means for operating the curtain comprising a motor-roller, its shaft and a spring connecting the roller and shaft, means for holding the shaft against movement when the roller is rotated in one direction for winding up the spring and means under the control of the swinging mirror-plate for locking and releasing the roller.

In testimony that I claim the foregoing as my invention I have signed my name, in presence of two witnesses, this 14th day of January, 1903.

GASSNER F. FRALEY.

Witnesses:
 FREDK. HAYNES,
 HENRY THIEME.